United States Patent
Su

(10) Patent No.: US 9,598,185 B2
(45) Date of Patent: Mar. 21, 2017

(54) MATERIAL FILLING APPARATUS FOR 3D PRINTING

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventor: Tzu-Hua Su, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 68 days.

(21) Appl. No.: 14/843,292

(22) Filed: Sep. 2, 2015

(65) Prior Publication Data
US 2017/0036787 A1  Feb. 9, 2017

(30) Foreign Application Priority Data
Aug. 3, 2015  (CN) .......................... 2015 1 0479385

(51) Int. Cl.
B65B 1/28  (2006.01)
B65B 3/18  (2006.01)
B33Y 40/00  (2015.01)

(52) U.S. Cl.
CPC .................. *B65B 1/28* (2013.01); *B65B 3/18* (2013.01); *B33Y 40/00* (2014.12)

(58) Field of Classification Search
CPC .... B65B 1/04; B65B 1/28; B65B 3/04; B65B 3/18; B33Y 40/00
USPC ....... 141/18; 264/129; 427/197; 700/118–119
See application file for complete search history.

(56) References Cited

U.S. PATENT DOCUMENTS

| | | | | |
|---|---|---|---|---|
| 5,874,976 A | * | 2/1999 | Katon | B41J 2/17509 347/85 |
| 6,332,481 B1 | * | 12/2001 | Shinada | B41J 2/17503 141/18 |
| 6,405,095 B1 | * | 6/2002 | Jang | B29C 67/0081 264/308 |
| 6,539,985 B2 | * | 4/2003 | Shinada | B41J 2/17503 141/114 |

(Continued)

*Primary Examiner* — Nicolas A Arnett
(74) *Attorney, Agent, or Firm* — Chun-Ming Shih; HDLS IPR Services

(57) ABSTRACT

A material filling apparatus for 3D printing fills materials into a material tank by a feeding part and includes a fixed sleeve with a first open end and a fixed end connected to the feeding part, a moving sleeve movably inserted and tightly fitted and interfered with the fixed sleeve, and a material output pipe inserted into the moving sleeve. The material tank is movably sheathed on the material output pipe. The moving sleeve has a second open end and a blocking end. The material output pipe has a connecting end and a material output end. The blocking end blocks the rear end of the material tank. The material tank squeezed by the filled material moves the connecting end towards the material output end and the rear end away from the material output end to push the blocking end and move the moving sleeve together with the material tank.

10 Claims, 8 Drawing Sheets

(56) References Cited

U.S. PATENT DOCUMENTS

| | | | | |
|---|---|---|---|---|
| 7,828,022 | B2* | 11/2010 | Davidson | B29C 67/0077 141/18 |
| 7,979,152 | B2* | 7/2011 | Davidson | B29C 67/0077 141/98 |
| 8,185,229 | B2* | 5/2012 | Davidson | B29C 67/0077 141/8 |
| 8,798,780 | B2* | 8/2014 | Menchik | B29C 67/0059 347/86 |
| 8,955,558 | B2* | 2/2015 | Bosveld | B29C 67/0085 141/18 |
| 2001/0050113 | A1* | 12/2001 | Shinada | B41J 2/17503 141/18 |
| 2001/0052370 | A1* | 12/2001 | Shinada | B41J 2/17503 141/2 |
| 2008/0047628 | A1* | 2/2008 | Davidson | B29C 67/0077 141/18 |
| 2013/0333798 | A1* | 12/2013 | Bosveld | B29C 67/0085 141/2 |

* cited by examiner

MATERIAL FILLING APPARATUS FOR 3D PRINTING

FIELD OF THE INVENTION

The technical field relates to an apparatus of filling a material into a material tank, more particularly to a material filling apparatus for 3D printing.

BACKGROUND OF THE INVENTION 3D printing, a rapid prototyping technology also known as additive manufacturing (AM) or additive layer manufacturing, mainly uses a digital model file as a basis and an adhesive material such as a metal powder, plastic or resin to build an object by the processes of stacking and accumulating layers on top of one another according to the digital model file, so as to manufacture a three-dimensional physical model of any shape.

The aforementioned adhesive material is filled into a material tank before use, and then the material tank is installed to a 3D printer for the 3D printing. To run the 3D printing smoothly and successfully without any formation of vacancy, the material filled in the material tank must be firm and free of air gaps.

However, the material filled in the material tank by a feeding machine requires users to push at the rear of the material tank by hand in order to keep the filled-in material firm and free of air gaps. As the material is filled up into the space of the material tank gradually, the material tank is forced to retract. Now, the user's hand has to push the rear of the material tank while the user is moving backward to slow down the retracting speed of the material tank and fill the material into the material tank in a firm and air gaps free manner. In other words, the conventional method of filling material into a material tank is very troublesome and inconvenient to users. Although the conventional method can achieve the effect of filling the material in a firm and air gaps free manner, yet it requires the users to control the retracting speed of the material tank by hand all the time. Obviously, the conventional method requires improvements.

In view of the aforementioned problem, the discloser of this disclosure based on years of experience in the industry to conduct extensive researches and experiments and finally provided a feasible solution to overcome the problems of the prior art effectively.

SUMMARY OF THE INVENTION

It is a primary objective of this disclosure to provide a material filling apparatus for 3D printing capable of saving the trouble of controlling the retracting speed of the material tank by hand since the movement of the material tank slows down automatically with the moving speed of the material filled into the material tank.

To achieve the aforementioned objective, this disclosure provides a material filling apparatus for 3D printing capable of filling a material into a material tank through a feeding part of a feeding machine, and the material tank has a front end and a rear end, and the material filling apparatus comprises: a fixed sleeve, having a fixed end connected to the feeding part and a first open end opposite to the fixed end; a moving sleeve, movably inserted and tightly fitted into and interfered with the fixed sleeve, and having a second open end corresponsive to the fixed end and a blocking end corresponsive to the first open end; and a material output pipe, inserted into the moving sleeve, and having a connecting end connected to the feeding part and a material output end opposite to the connecting end, and the material tank being movable sheathed on the exterior of the material output pipe, and the rear end and of the material tank and the material output end are movably situated opposite to one another, and the blocking end of the moving sleeve blocking the rear end of the material tank; wherein, the material tank is squeezed by the filling material of the feeding machine to move in a direction from the connecting end towards the material output end, and the rear end of the material tank moves away from the material output end of the material output pipe and pushes the blocking end of the moving sleeve, so that the moving sleeve moves together with the material tank with respect to the fixed sleeve.

Compared with the prior art, this disclosure has the following effects: The blocking end of the moving sleeve is capable of blocking and being driven by the rear end of the material tank, and the moving sleeve and the fixed sleeve are tightly fitted and interfered with each other, so that when the moving sleeve is moved with respect to the fixed sleeve, the moving speed of the material tank moving in that direction slows down automatically, and the material can be filled in a firm and air gaps free manner, and thus saving the trouble of controlling the speed of the material tank by hand.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

Figure 1:
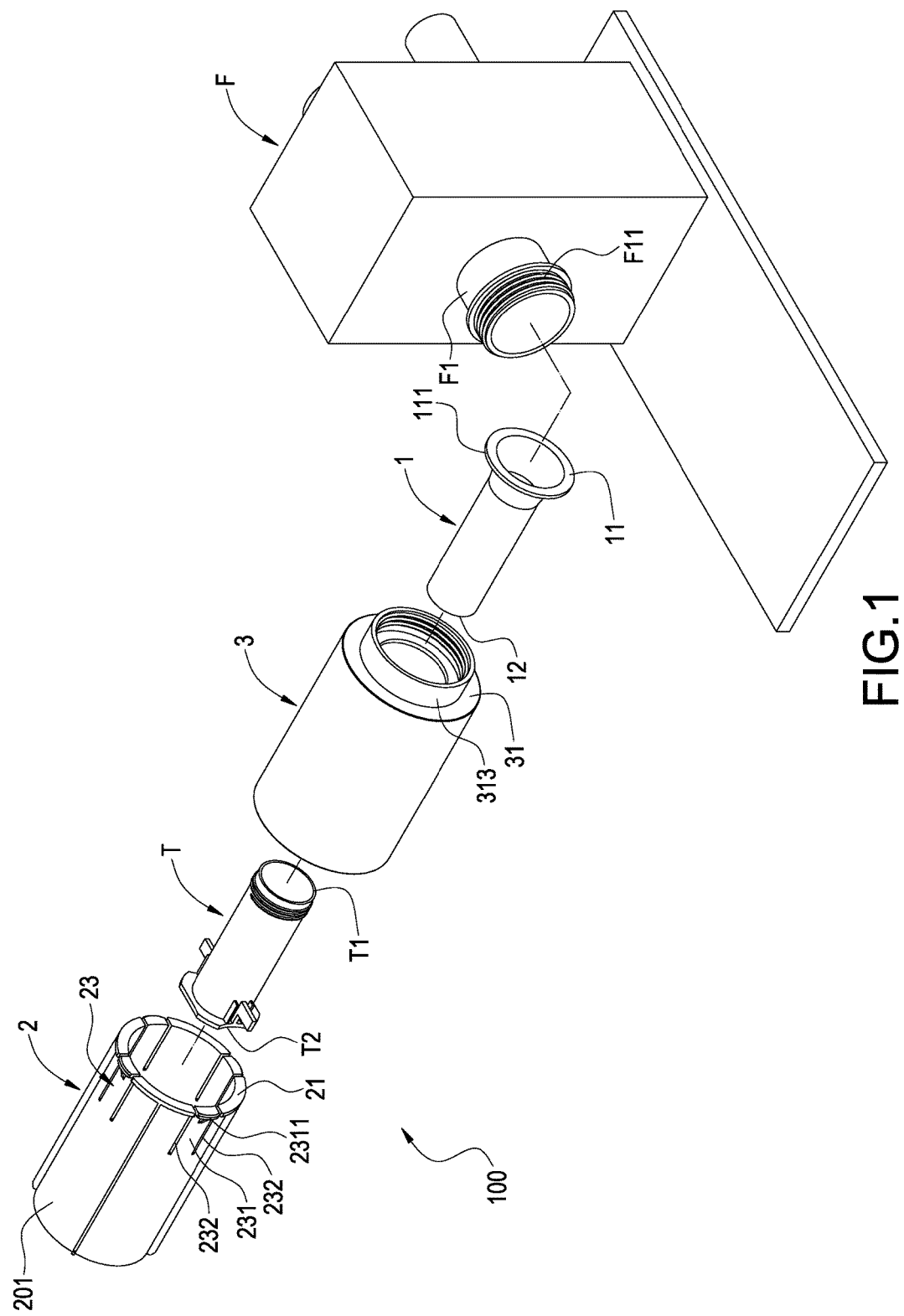
FIG. 1 is an exploded view of a material filling apparatus installed between a material tank and a feeding machine in accordance with a first embodiment of this disclosure.
Figure 2:
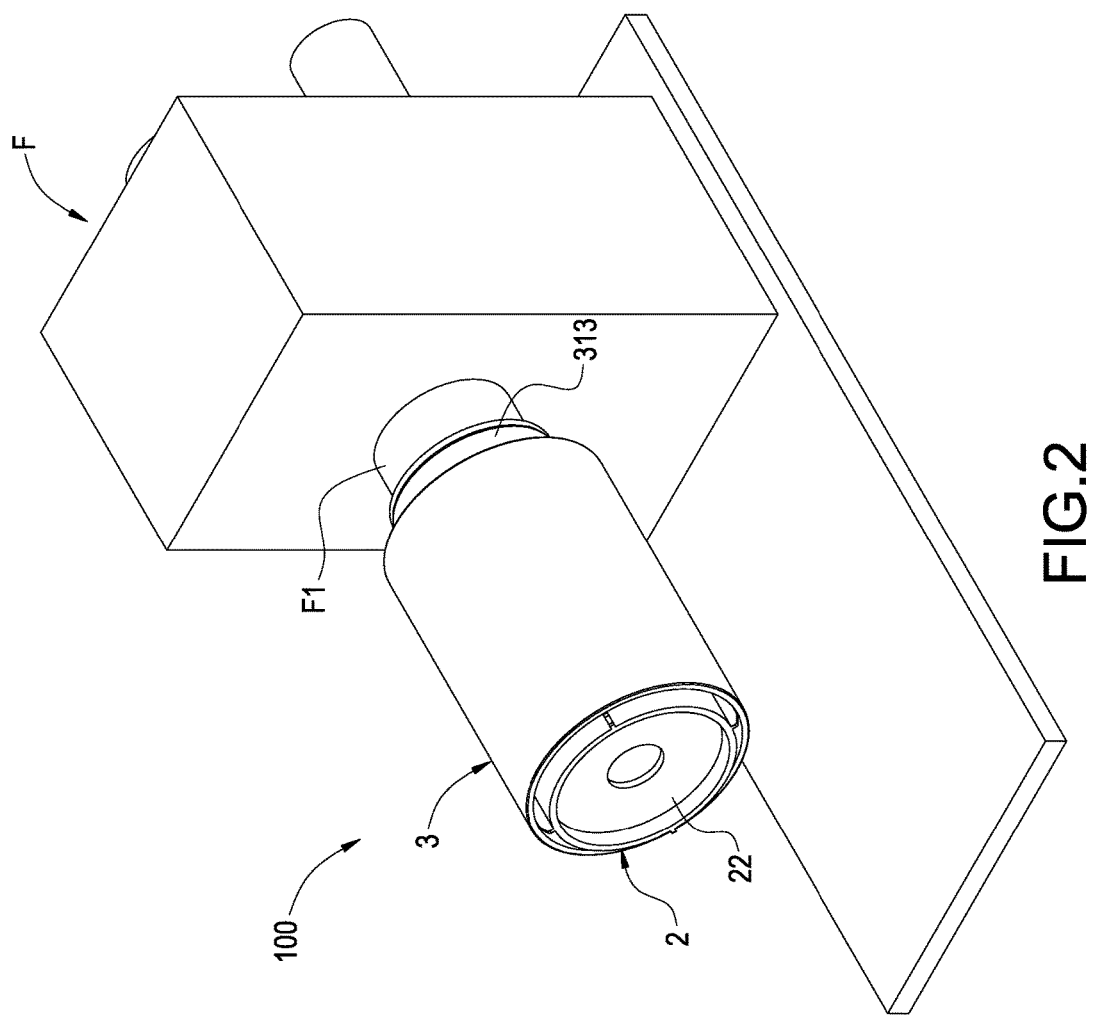
FIG. 2 is a perspective view of the assembly of the material filling apparatus as depicted in FIG. 1.

With reference to FIG. 1 for a material filling apparatus for 3D printing in accordance with this disclosure, the apparatus is provided for filling a material into a material tank. The material is filled into the material tank T through a feeding part F1 of a feeding machine F for the 3D printing, wherein the feeding part F1 is an open part or a tubular part, and the tubular part is used below for illustrating this disclosure.

Figure 3:
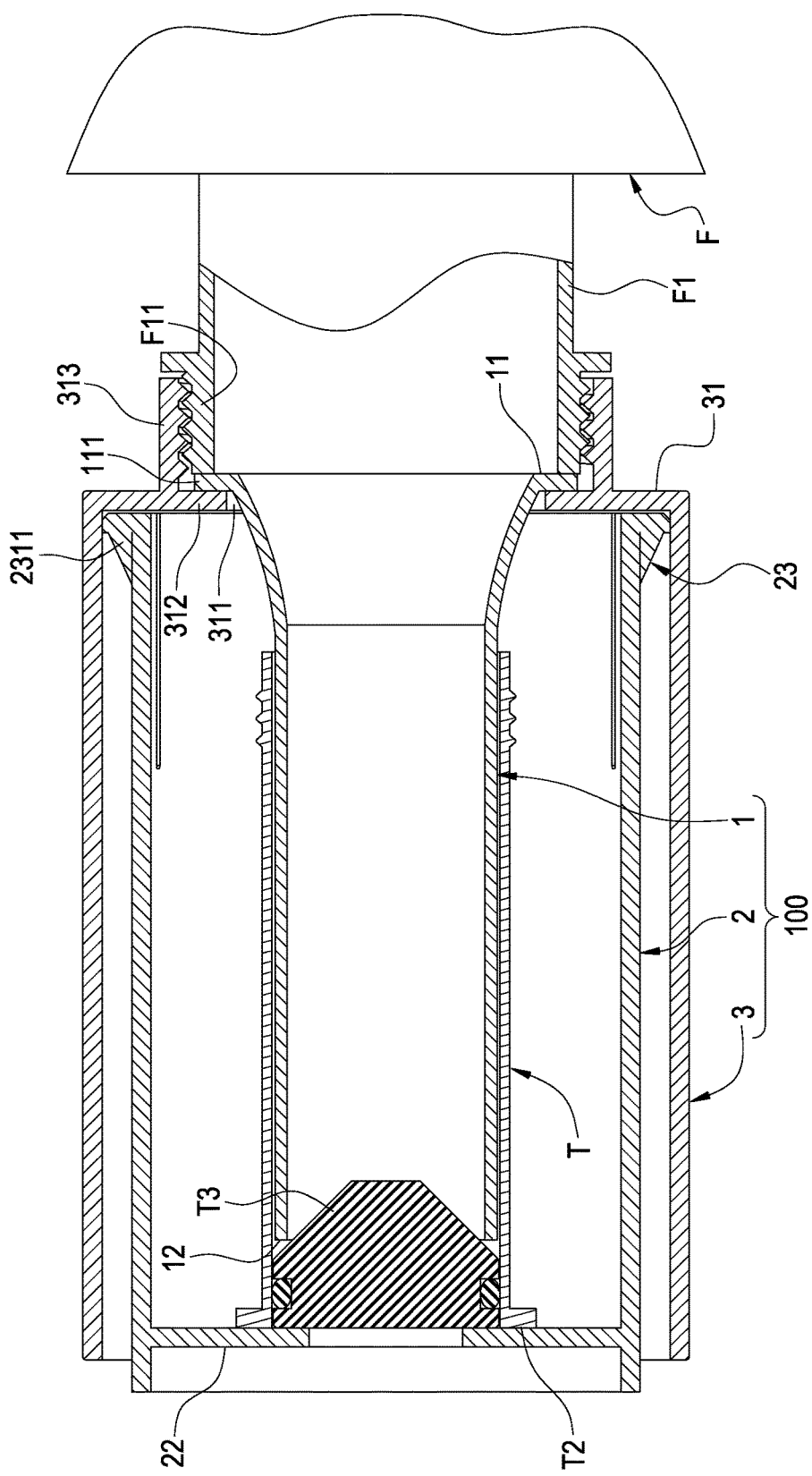
FIG. 3 is a cross-sectional view of the assembly as depicted in FIG. 1.

The material tank T is a hollow tank having a front end T1 and a rear end T2, and the material tank T is plugged with a piston T3 (as shown in FIG. 3). The front end T1 and the rear end T2 are open ends. When a material is filled into the material tank T, it is better to keep the piston T3 closer to the rear end T2 to provide a maximum filling space. In practice (as shown in FIG. 3), a rear end (not labeled in the figure) of the piston T3 is substantially and precisely aligned with the rear end T2 of the material tank T.

With reference to FIGS. 1 to 4 for a material filling apparatus 100 of this disclosure, the material filling apparatus 100 comprises a material output pipe 1, a moving sleeve 2 and a fixed sleeve 3.

The fixed sleeve 3 is hollow and has a fixed end 31 and a first open end 32 disposed opposite to each other. The fixed sleeve 3 is coupled to the feeding part F1 through the fixed end 31.

The moving sleeve 2 is hollow and movably inserted and tightly fitted into and interfered with the fixed sleeve 3, so that a relative movement between the moving sleeve 2 and the fixed sleeve 3 produces a resistance. In other words, when the moving sleeve 2 is moved with respect to the fixed sleeve 3 to extend or retract coaxially, the tightly fitted and interfered components produce a resistance. The moving sleeve 2 has a second open end 21 corresponsive to the fixed end 31 and a blocking end 22 corresponsive to the first open end 32, and the second open end 21 and the blocking end 22 are disposed opposite to each other.

The material output pipe 1 is hollow and inserted into the moving sleeve 2. The material output pipe 1 has a connecting end 11 coupled to the feeding part F1 and a material output end 12 disposed opposite to the connecting end 11, so that the material output pipe 1 is coupled and communicated with the feeding part F1 through the connecting end 11, and the moving sleeve 2 and the material output pipe 1 are disposed with an interval apart from each other.

The material tank T has a front end T1 movably sheathed on the material output pipe 1, so that the material tank T can extend or retract coaxially with respect to the material output pipe 1 and the rear end T2 of the material tank T can be moved with respect to the material output end 12. In other words, the rear end T2 of the material tank T is opposite to the material output end 12 and they can be moved with respect to each other, since the material tank T can extend or retract coaxially with respect to the material output pipe 1. The blocking end 22 of the moving sleeve 2 blocks the rear end T2 of the material tank T. Now, the blocking end 22 blocks the rear end T2 of the material tank T, so that when the material is filled, the piston T3 will not fall off from the rear end T2.

Wherein, the material output end 12 of the material output pipe 1 is disposed in the material tank T. The closer to the rear end T2 of the material tank T, the better. In this embodiment (as shown in FIG. 3), the material output end 12 is near (or coupled to) the piston T3 to facilitate the process of starting to fill the material from a position near the rear end T2 of the material tank T first.

Figure 4:
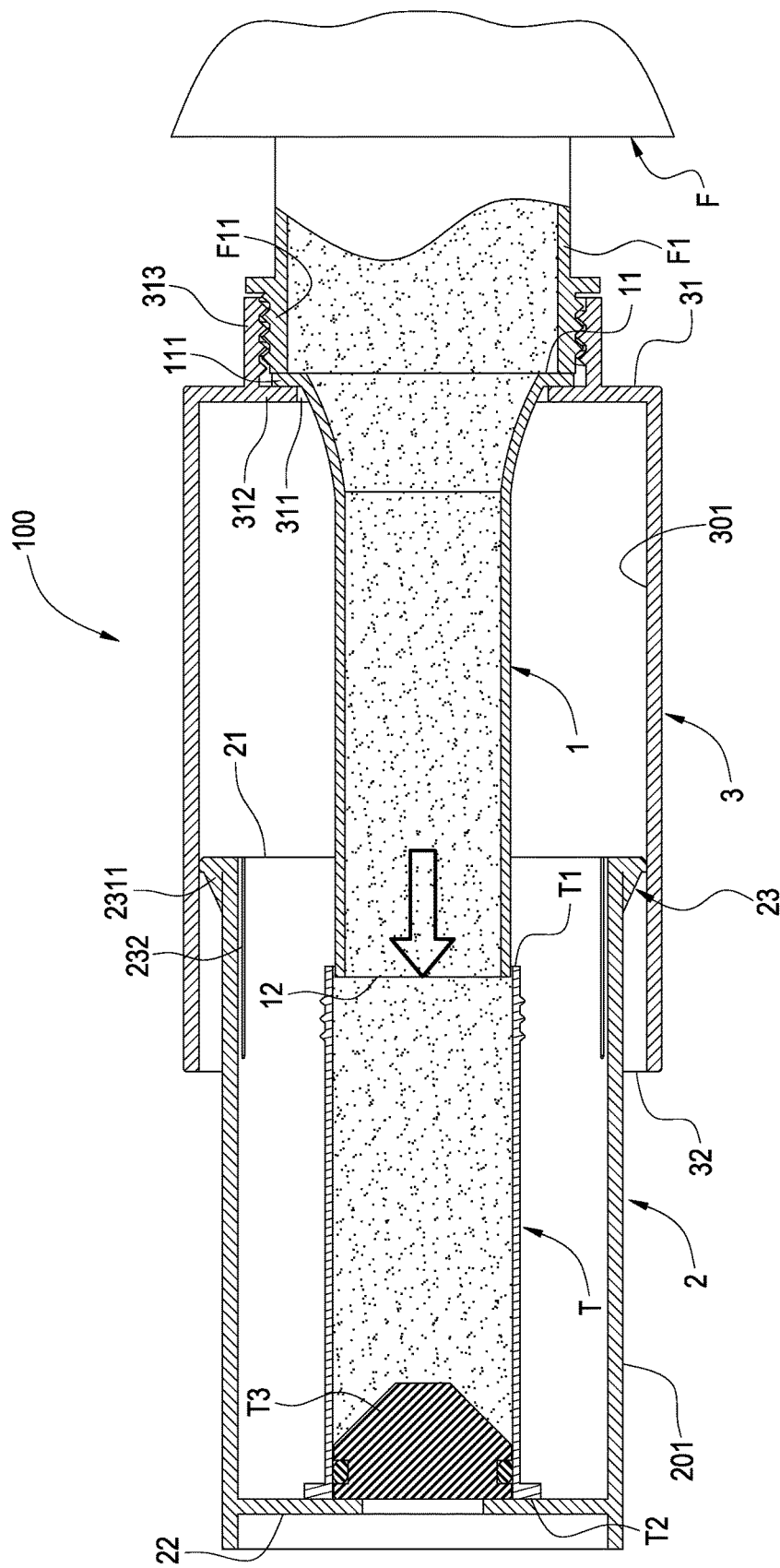
FIG. 4 is a cross-sectional view a material filling apparatus after being filled with materials in accordance with the first embodiment of this disclosure.
Figure 8:
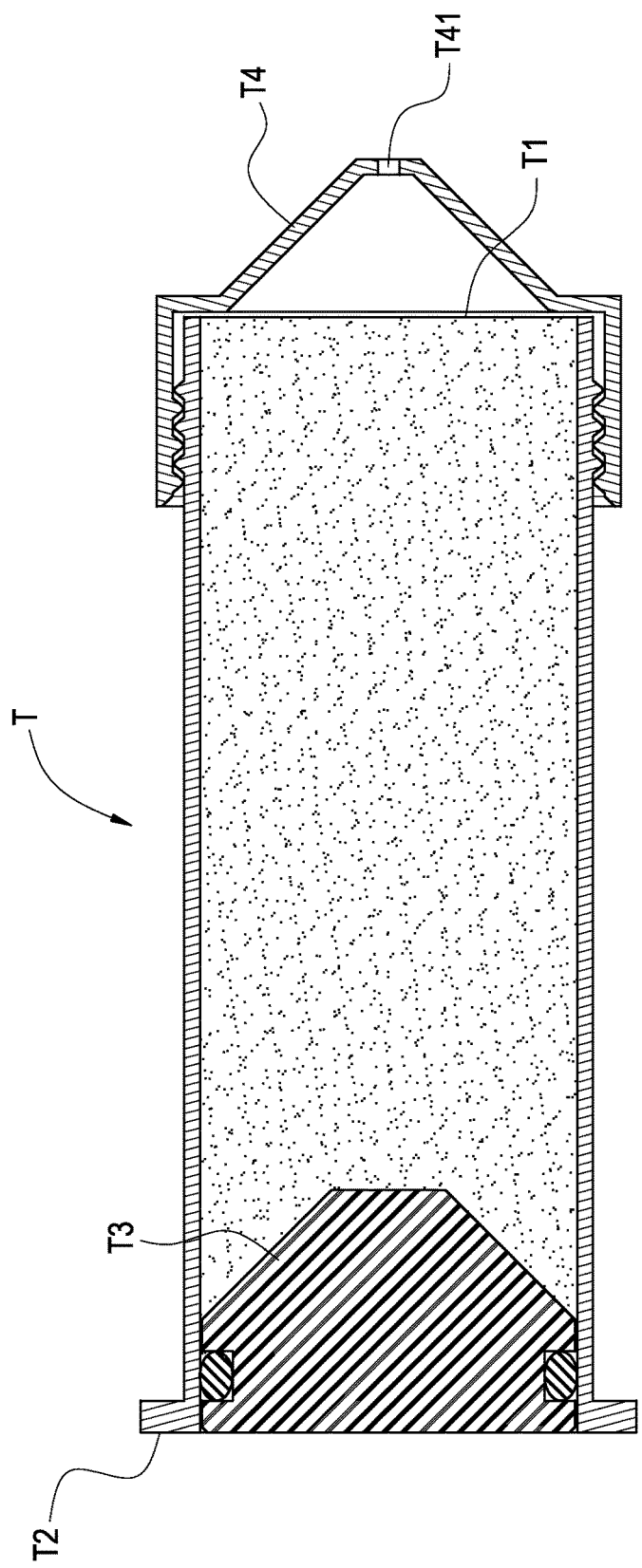
FIG. 8 is a cross-sectional view of a material filling apparatus filled with materials and a material tank covered by a lid in accordance with this disclosure.

In FIGS. 3 and 4, the moving sleeve 2 is removed from the fixed sleeve 3 before filling the material into the material tank T, and then the material tank T with the removed lid T4 (as shown in FIG. 8) is movably sheathed on the material output pipe 1, and finally the moving sleeve 2 is inserted back into the fixed sleeve 3. Now, the piston T3 is situated in the rear end T2 of the material tank T.

When the feeding machine F starts feeding the material by the material output pipe 1, the material output end 12 of the material output pipe 1 is near or coupled to the piston T3, so that the material can be filled from the position near the rear end T2 of the material tank T first and then the position near the piston T3. As the amount of filled material becomes larger, the material tank T is compressed by the filled material to move along the material output pipe 1 in a direction from the connecting end 11 towards the material output end 12. In other words, the material tank T extends with respect to the material output pipe 1 in the direction (from the connecting end 11 towards the material output end 12).

The rear end T2 of the gradually extended material tank T will be situated at a position away from the material output end 12 of the material output pipe 1 to push the blocking end 22 of the moving sleeve 2 accordingly, so that the moving sleeve 2 moves with the material tank T in the same direction (from the connecting end 11 towards the material output end 12), and the moving sleeve 2 is moved with respect to the fixed sleeve 3.

Now, the moving sleeve 2 and the fixed sleeve 3 are tightly fitted and interfered with each other, so that a resistance is produced when the moving sleeve 2 is moved with respect to the fixed sleeve 3, and the resistance slows down the speed of the material tank T moving in the aforementioned direction and gives the same effect as pushing the rear end T2 of the material tank T by hand. Therefore, such arrangement gives the effect of filling a material in a firm and air gaps free manner.

Wherein, the length of the moving sleeve 2 is greater than the length of the material tank T, so that when the material tank T is filled up to retract to all the way to the bottom, the moving sleeve 2 is still maintained at the status of keeping the fixed sleeve 3 tightly fitted and interfered.

In addition, there are different ways of connecting the material output pipe 1 to the feeding part F1 and connecting the fixed sleeve 3 to the feeding part F1, and one of these methods is illustrated in the following embodiment.

A through hole 311 is formed at the fixed end 31 of the fixed sleeve 3, and the fixed end 31 further has an abutted flange 312 and a screwing part 313. Wherein, the abutted flange 312 is axially protruded from the periphery of a position corresponsive to the through hole 311. Specifically, the abutted flange 312 is formed by extending a distance in a direction from a position of the periphery of the fixed end 31 corresponsive to the through hole 311 towards the center of the through hole 311. The screwing part 313 is formed by protruding in a direction from a position of the fixed end 31 corresponsive to the through hole 311 towards the feeding machine F. A pressed flange 111 is protruded radially from the connecting end 11 of the material output pipe 1 and the feeding part F1 has a screwed section F11 corresponsive to the screwing part 313.

During assembling, the connecting end 11 of the material output pipe 1 is connected to the feeding part F1, and then the screwing part 313 of the fixed sleeve 3 is detachably screwed to a screwed section F11 of the feeding part F1. Now, the pressed flange 111 is disposed between the abutted flange 312 and the feeding part F1, so that while the screwing part 313 is being screwed to the screwed section F11, the pressed flange 111 is pressed and positioned between the abutted flange 312 and the feeding part F1 to fix the material output pipe 1 and the fixed sleeve 3 to the feeding part F1 and communicating the material output pipe 1 with the feeding part F1.

The moving sleeve 2 and the fixed sleeve 3 are tightly fitted and interfered with each other to produce resistance.

The same arrangement applies to the following embodiments, but it is noteworthy that this disclosure is not limited to such arrangement only.

In the first embodiment of this disclosure as shown in FIGS. 1, 3 and 4, the moving sleeve 2 has an interfering section 23 disposed around the moving sleeve 2, and the interfering section 23 includes a plurality of elastic arms 231 disposed apart with each other and around the interfering section 23. In this embodiment, each elastic arm 231 is formed with a groove 232. The moving sleeve 2 has plural pairs of grooves 232 axially formed thereon, and each pair of grooves 232 is formed from a position (which may be any position between the second open end 21 and the blocking end 22) to the second open end 21, and each elastic arm 231 is formed between each pair of grooves 232, and each elastic arm 231 is integrally formed with the moving sleeve 2.

Each elastic arm 231 has an end coupled to the moving sleeve 2 and the other end having an abutting member 2311. In this embodiment, the abutting member 2311 is protruded in a direction towards an inner wall 301 of the fixed sleeve 3, so that each elastic arm 231 of the moving sleeve 2 is elastically abutted and coupled to the inner wall 301 of the fixed sleeve 3 through the abutting member 2311 and both of them are tightly fitted and interfered with each other to produce a resistance.

Figure 5:
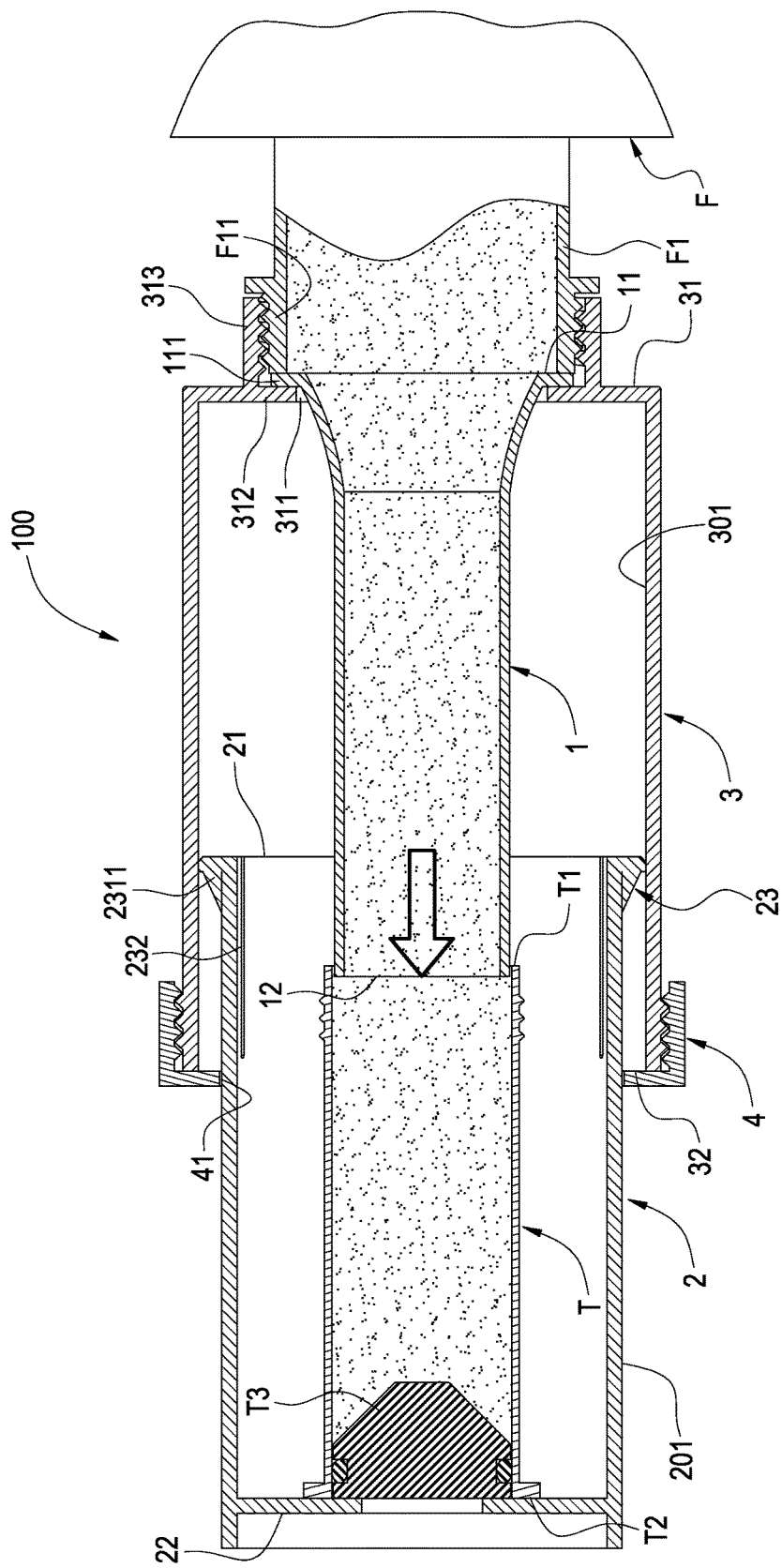
FIG. 5 is a cross-sectional view of a material filling apparatus in accordance with a second embodiment of this disclosure.

With reference to FIG. 5 for the second embodiment of this disclosure, the second embodiment is substantially the same as the first embodiment, except that the second embodiment further comprises an end cover 4. In other words, the interference between the moving sleeve 2 and the fixed sleeve 3 is in accordance with the second embodiment is identical to that of the first embodiment, and the second embodiment further adds an end cover 4 for interfering the abutting member 2311 to provide a limiting effect.

In the second embodiment, the end cover 4 is covered onto the first open end 32 of the fixed sleeve 3 and has an opening 41 formed thereon. The moving sleeve 3 is inserted into the opening 41 and tightly fitted into and interfered with the fixed sleeve 3. Now, each abutting member 2311 of the moving sleeve 2 is limited by the end cover 4 (as shown in FIG. 5) and will not fall out from fixed sleeve 3 unless the end cover 4 is removed.

The end cover 4 as shown in FIG. 5 is screwed to the exterior of the fixed sleeve 3, so that the end cover 4 may be freely installed to the fixed sleeve 3.

Figure 6:
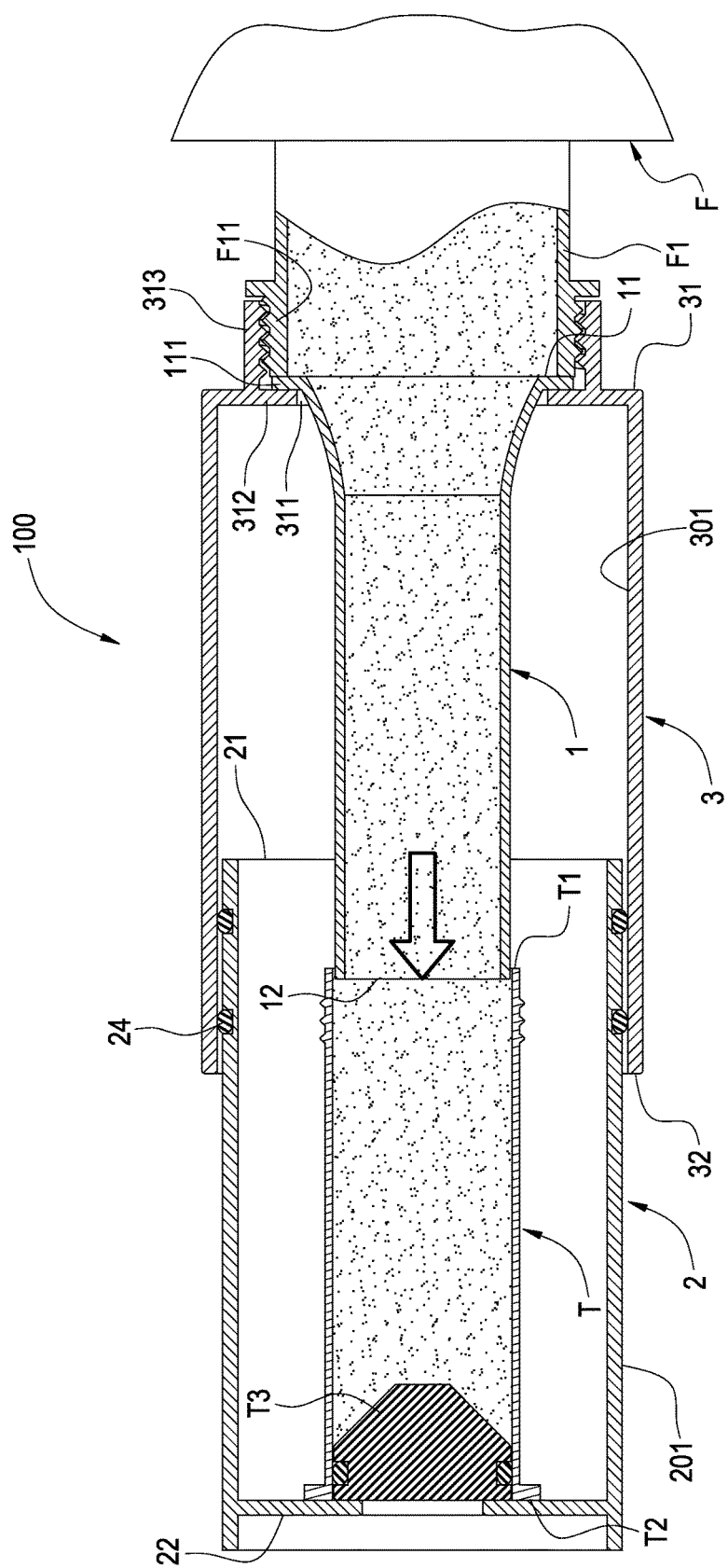
FIG. 6 is a cross-sectional view of a material filling apparatus in accordance with a third embodiment of this disclosure.

With reference to FIG. 6 for the third embodiment of this disclosure, the third embodiment is substantially the same as the first embodiment, except that the interference between the moving sleeve 2 and the fixed sleeve 3 in accordance with the third embodiment is different from that of the first embodiment.

In the third embodiment, at least one gasket 24 is mounted around the outer wall 201 of the moving sleeve 2. In this embodiment, plural gaskets 24 are mounted, and each gasket 24 is contacted with the inner wall 301 of the fixed sleeve 3 to produce friction and resistance, and the resistance slows down the moving speed of the material tank T in the specific direction.

Figure 7:
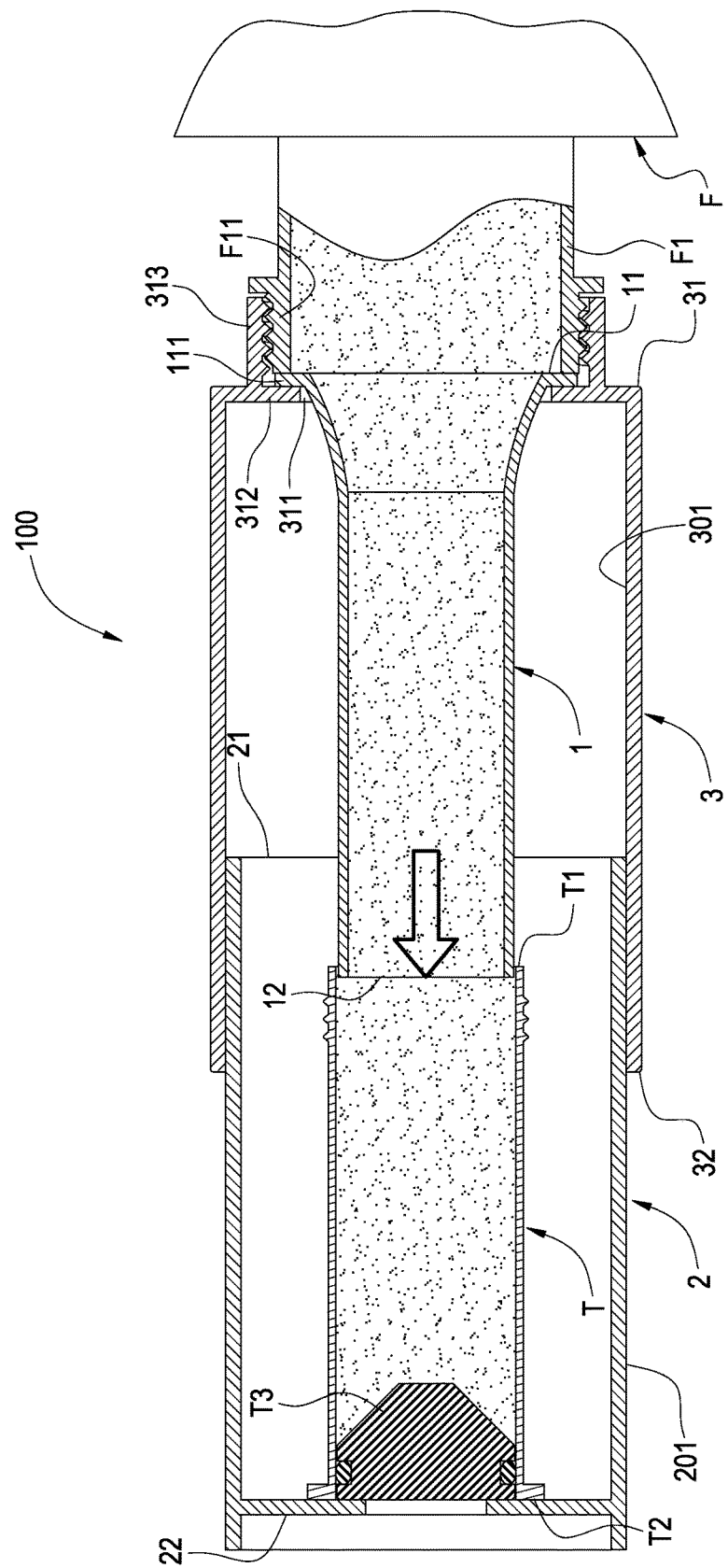
FIG. 7 is a cross-sectional view of a material filling apparatus in accordance with a fourth embodiment of this disclosure.

With reference to FIG. 7 for the fourth embodiment of this disclosure, the fourth embodiment is substantially the same as the first embodiment, except that the interference between the moving sleeve 2 and the fixed sleeve 3 in accordance with the fourth embodiment is different from that of the first embodiment.

In the fourth embodiment, the outer wall 201 of the moving sleeve 2 is tightly fitted and interfered with the inner wall 301 of the fixed sleeve 3 to produce a resistance, and the resistance slows down the moving speed of the material tank T in the specific direction.

With reference to FIG. 8 for a perspective view of a material tank T after filling a material into the material tank T, the material tank T is removed from the material filling apparatus 100 of this disclosure, and a lid T4 is fixed to the front end T1, so that the material tank T is ready for the use by a 3D printer (not shown in the figure). In a 3D printing process, the material tank T is installed to the 3D printer first, and the 3D printer controls a piston T3 to move in a direction towards the lid T4 during the printing process, so that the material contained in the material tank T can be squeezed out from a hole T41 of the lid T4 and provided for the 3D printing.

In summation of the description above, this disclosure has the following improvement over the prior art. The blocking end 22 of the moving sleeve 2 is capable of blocking and being driven by the rear end T2 of the material tank T, and the moving sleeve 2 and the fixed sleeve 3 are tightly fitted and interfered with each other, so that a resistance is produced when the moving sleeve 2 is moved with respect to the fixed sleeve 3, and the resistance slows down the speed of the material tank T moving in the specific direction, so as to achieve the effect of filling a material in a firm and air gaps free manner, and save the trouble of the conventional method of controlling the speed of the material tank by hand.

In addition, this disclosure also has another effect as described below: The material output end 12 of the material output pipe 1 is disposed in the material tank T and near (or coupled to) the piston T3 to facilitate the process of starting to fill a material from a position near the rear end T2 of the material tank T and fulfill the filling space requirement for filling up the material into material tank T perfectly.

While this disclosure has been described by means of specific embodiments, numerous modifications and variations could be made thereto by those skilled in the art without departing from the scope and spirit of this disclosure set forth in the claims.

What is claimed is:

1. A material filling apparatus for 3D printing, capable of filling a material into a material tank through a feeding part of a feeding machine, and the material tank having a front end and a rear end, and the material filling apparatus comprising: a fixed sleeve, having a fixed end connected to the feeding part and a first open end opposite to the fixed end; a moving sleeve, movably inserted and tightly fitted into and interfered with the fixed sleeve, and having a second open end corresponsive to the fixed end and a blocking end corresponsive to the first open end; and a material output pipe, inserted into the moving sleeve, and having a connecting end connected to the feeding part and a material output end opposite to the connecting end, and the material tank being movable sheathed on the exterior of the material output pipe, and the rear end of the material tank and the material output end being movably situated opposite to one another, and the blocking end of the moving sleeve blocking the rear end of the material tank; wherein, the material tank is squeezed by the filling material of the feeding machine to move in a direction from the connecting end towards the material output end, and the rear end of the material tank moves away from the material output end of the material output pipe and pushes the blocking end of the moving sleeve, so that the moving sleeve moves together with the material tank with respect to the fixed sleeve.

2. The material filling apparatus for 3D printing according to claim 1, wherein the material output end of the material output pipe is proximate to the rear end of the material tank.

3. The material filling apparatus for 3D printing according to claim 1, wherein the moving sleeve has an outer wall, and the fixed sleeve has an inner wall, and the outer wall of the moving sleeve is tightly fitted and interfered with the inner wall of the fixed sleeve.

4. The material filling apparatus for 3D printing according to claim 1, wherein the moving sleeve has an outer wall, and the fixed sleeve has an inner wall, and at least one gasket installed around the outer wall of the moving sleeve and contacted and interfered with the inner wall of the fixed sleeve.

5. The material filling apparatus for 3D printing according to claim 1, wherein the moving sleeve has an interfering section disposed around the moving sleeve, and the interfering section includes a plurality of elastic arms arranged with an interval apart from each other and disposed around the interfering section, and each elastic arm has an end coupled to the moving sleeve and the other end having an abutting member elastically abutted at and interfered with the fixed sleeve.

6. The material filling apparatus for 3D printing according to claim 5, wherein the moving sleeve has plural pairs of grooves formed thereon, and each pair of grooves are formed from a position between the second open end and the blocking end to the second open end, and each elastic arm is formed between each pair of grooves.

7. The material filling apparatus for 3D printing according to claim 5, further comprising an end cover covered onto the first open end of the fixed sleeve and having an opening formed thereon, and the moving sleeve being plugged at a position corresponsive to the opening and tightly fitted into and interfered with the fixed sleeve, and the abutting member of each elastic arm of the moving sleeve being stopped by the end cover.

8. The material filling apparatus for 3D printing according to claim 1, wherein the fixed end of the fixed sleeve has a through hole, and the fixed sleeve has a screwing part configured corresponsive to the position of the through hole and protruded in a direction towards the feeding machine, and the screwing part of the fixed sleeve is detachably screwed to the feeding part, while positioning the connecting end of the material output pipe and communicating with the feeding part.

9. The material filling apparatus for 3D printing according to claim 8, wherein the fixed end has an abutted flange extending a distance from the periphery at a position corresponsive to the through hole towards the center of the through hole, and the connecting end has a pressed flange protruded from the connecting end, and disposed between the abutted flange and the feeding part, and pressed for positioning.

10. The material filling apparatus for 3D printing according to claim 1, wherein the blocking end of the moving sleeve is pushed by the rear end of the material tank to extend and retract with respect to the fixed sleeve.

* * * * *